(12) United States Patent
Sugihara et al.

(10) Patent No.: US 11,797,402 B1
(45) Date of Patent: Oct. 24, 2023

(54) STORAGE SYSTEM AND CONTROL METHOD

(71) Applicant: Hitachi, Ltd., Tokyo (JP)

(72) Inventors: Keita Sugihara, Tokyo (JP); Keisuke Matsumoto, Tokyo (JP); Genki Matsuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/110,418

(22) Filed: Feb. 16, 2023

(30) Foreign Application Priority Data

Jul. 26, 2022 (JP) ................................. 2022-118839

(51) Int. Cl.
*G06F 11/20* (2006.01)
(52) U.S. Cl.
CPC .................................. *G06F 11/203* (2013.01)
(58) Field of Classification Search
CPC .................................................. G06F 11/203
See application file for complete search history.

(56) References Cited

U.S. PATENT DOCUMENTS

| 10,417,102 B2 * | 9/2019 | Sanakkayala | ............ H04L 43/10 |
| 2020/0192693 A1 * | 6/2020 | Kawase | ............... G06F 9/45558 |
| 2022/0129357 A1 * | 4/2022 | Sugihara | .............. G06F 11/2028 |

FOREIGN PATENT DOCUMENTS

JP        6759317 B2    9/2020

\* cited by examiner

*Primary Examiner* — Matthew M Kim
*Assistant Examiner* — Kyle Emanuele
(74) *Attorney, Agent, or Firm* — MATTINGLY & MALUR, PC

(57) ABSTRACT

A storage system with high availability is provided. The storage system is designed to be provided with: a generation unit that generates information of an association volume which is associated with each volume, on the basis of information of each volume created at each of a plurality of storage devices designated from two or more sites; and an instruction unit that issues an instruction to each storage device, at which each volume is created, to connect each volume associated with the association volume and a compute node which operates a container, on the basis of a request for activation of the container for which the information of the association volume generated by the generation unit is designated.

6 Claims, 13 Drawing Sheets

FIG. 6

| Volume Identifying ID | Storage Identifying ID | NAA | Storage A Serial | Storage A Volume ID | Storage B Serial | Storage B Volume ID |
|---|---|---|---|---|---|---|
| PV_A | SC_A | 60060e8000000000000000000000111 | 11111 | 100 | 22222 | 200 |
| PV_B | SC_B | 60060e8000000000000000000000222 | 33333 | 300 | 44444 | 400 |

FIG. 7

| NAA | Storage Volume ID | Storage Serial | With/Without Preferential Setting |
|---|---|---|---|
| 60060e8000000000000000000000111 | 100 | 11111 | With |
| 60060e8000000000000000000000111 | 200 | 22222 | Without |

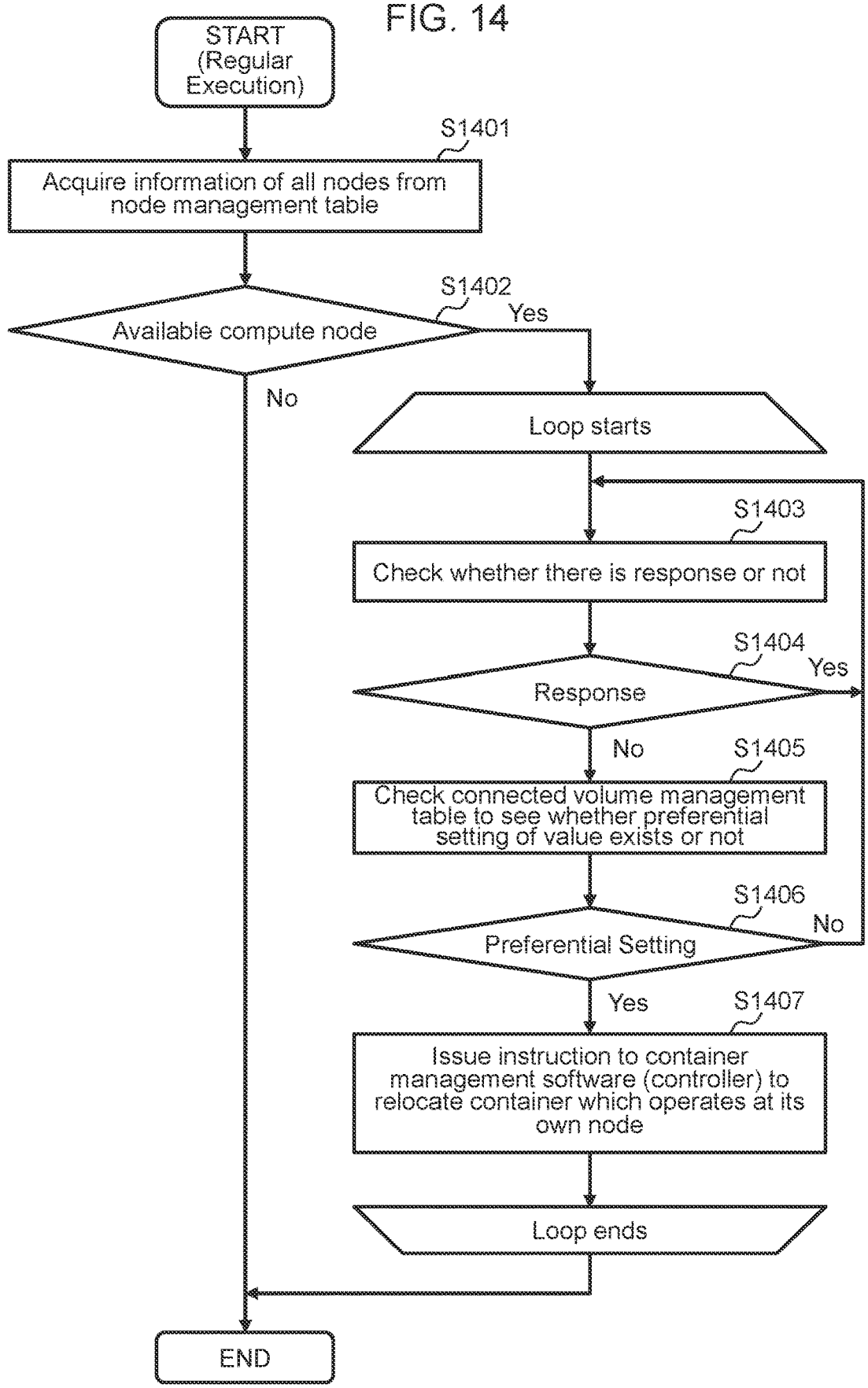

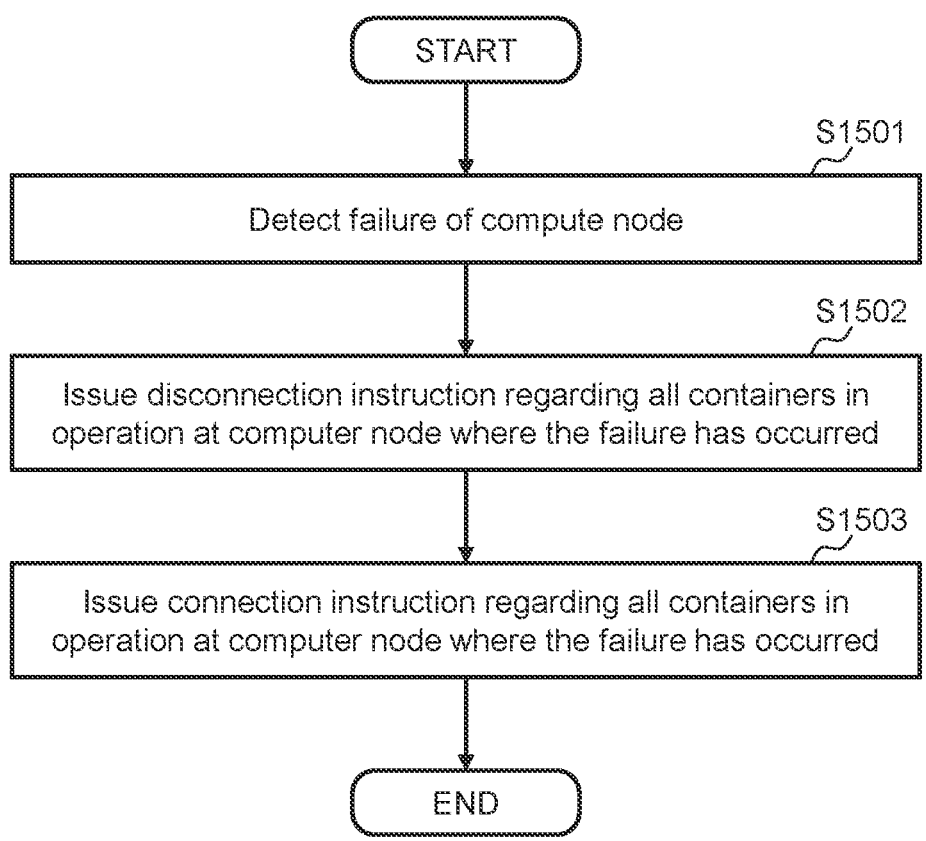

STORAGE SYSTEM AND CONTROL METHOD

CROSS-REFERENCE TO RELATED APPLICATION

This application claims priority pursuant to 35 U.S.C. § 119 from Japanese Patent Application No. 2022-118839, filed on Jul. 26, 2022, the entire disclosure of which is hereby incorporated herein by reference.

TECHNICAL FIELD

Background

The present invention generally relates to a technology for enhancing availability of a storage system.

Related Art

As a method for enhancing availability of a storage system which uses a container(s), there is a method for distributing server apparatuses which constitute a cluster to a plurality of sites. If a plurality of sites exist in the cluster, it is necessary to locate a storage device(s) at each site and also enhance the availability of the storage devices.

Regarding the availability of the storage devices themselves, redundancy is secured by locating the storage device(s) at each site and synchronizing volumes, which are created from the respective storage devices, thereby making it possible to enhance the availability of the storage devices. Regarding a container(s), there is disclosed a container provision support system capable of shortening time required to provide the container(s) (see Japanese Patent Publication No. 6759317 (Patent Literature 1)).

With the container provision support system described in Patent Literature 1, a first volume at a first site, a container image which is required to activate a container at a second site, and a second volume used by an application program (hereinafter referred to as an "APP") executed at the container are linked to each other by management information. Therefore, the container image and the volume which are required to activate the container can be easily identified at the second site and the container can be activated in a short period of time at the second site.

SUMMARY OF THE INVENTION

If a failure has occurred at a site of an active system, the technology described in the above-mentioned Patent Literature 1 can switch to a site of a standby system in a short period of time; however, the container cannot be freely migrated between the site of the active system and the site of the standby system, so it is difficult to enhance the availability of the container.

Under this circumstance, container management software (hereinafter referred to as the "container management software") saves one volume as one piece of data in a storage area possessed by the container management software. For example, even if a user sets a synchronization setting with respect to a plurality of volumes, the container management software still recognize the respective volumes as individual volumes. Specifically speaking, the container started by the container management software is connected to one volume, so that for example, if a failure which does not involve the relocation of the container has occurred at a storage device which provides the relevant volume, I/O is disconnected and the user can no longer continue working.

The present invention was devised in consideration of the above-described circumstances and aims at proposing, for example, a storage system with high availability.

In order to solve the above-described problem, there is provided according to the present invention a storage system for managing a cluster configured by including compute nodes that are nodes which are provided respectively at a plurality of sites and are capable of operating a container, wherein storage devices providing volumes which can be used by the container are provided at each of the plurality of sites, wherein the storage system includes: a generation unit generation unit that generates information of an association volume which is associated with each of the volumes, on the basis of information of each of the volumes created at each of a plurality of storage devices designated from two or more sites; and an instruction unit that issues an instruction to each storage device, at which each of the volumes is created, to connect each volume associated with the association volume and a compute node which operates the container, on the basis of a request for activation of the container for which the information of the association volume generated by the generation unit is designated.

In the above-described configuration, the two volumes which are associated with the association volume are connected with the computer node which operates the container. So, for example, even if one of the storage devices becomes no longer available due to a failure when the two volumes are synchronized, the container can use the volume at the other storage device. If the above-described configuration is employed, the user can continue working without the disconnection of I/O.

The availability of the storage system can be enhanced according to the present invention. Any problems, configurations, and advantageous effects other than those described above will be clarified by the description of embodiments indicated below.

BRIEF DESCRIPTION OF THE DRAWINGS

FIG. 6 is a diagram illustrating one example of a volume management table according to the first embodiment;

FIG. 7 is a diagram illustrating one example of a connected volume management table according to the first embodiment;

FIG. 14 is a diagram illustrating one example of storage failure detection processing according to the first embodiment; and FIG. 15 is a diagram illustrating one example of node-failure-related processing according to the first embodiment.

DETAILED DESCRIPTION OF THE EMBODIMENTS

(I) First Embodiment

Figure 1:
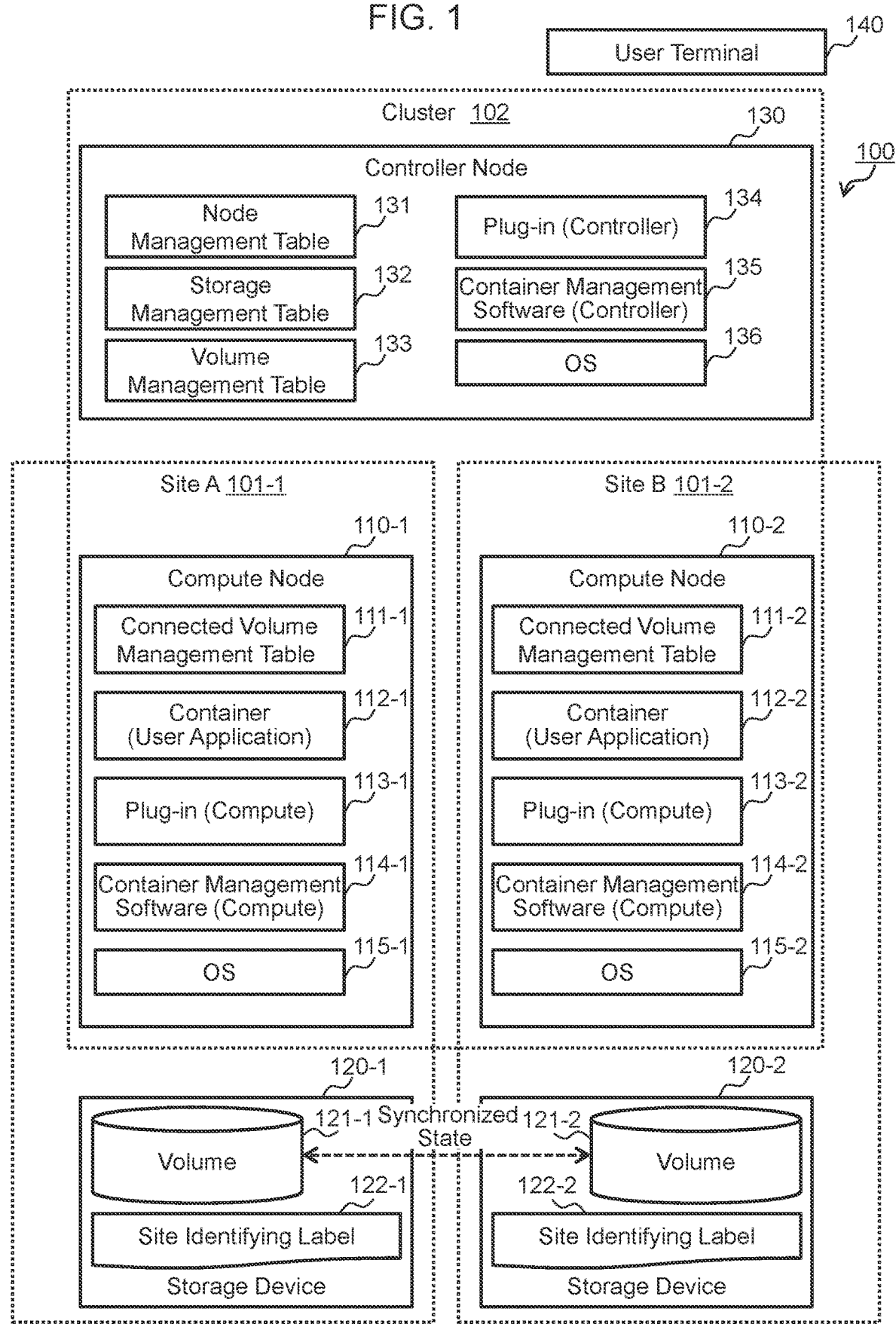
FIG. 1 is a diagram illustrating one example of the configuration of a storage system according to a first embodiment.

One embodiment of the present invention will be described below in detail. However, the present invention is not limited to the embodiment.

(A)

With a conventional technology, container management software recognizes a plurality of synchronized volumes respectively individually (independently).

(A-1)

If the respective volumes which are individually recognized become subject to I/O (Input/Output) from separate APPs respectively at the same time, there is fear that data may be destroyed.

In this embodiment in this regard, it is possible to eliminate the risk of data destruction as described above by treating the plurality of the synchronized volumes as a single volume.

For example, the container management software is caused to recognize the plurality of the synchronized volumes virtually as one volume (association volume).

As a result, the container management software recognizes the plurality of the synchronized volumes as one volume, so it is possible to avoid the situation where they may be connected from a plurality of different APPs at the same time.

(A-2)

If the individually recognized volumes are to be used differently depending on the site where a container is located, it is necessary to manually switch a volume to be connected every time the relocation of the container occurs. However, the relocation of the container may sometimes occur automatically, so that the involvement of the manual operations is not desirable.

In this embodiment in this regard, it becomes unnecessary to manually switch the volume by using the association volume.

For example, even if the relocation of the container to another site occurs, the container continues to refer to the volume(s) to which the container is originally linked.

In other words, by linking the association volume, it is unnecessary to manually switch the volume no matter at which site the container is located.

(B)

With the conventional technology, if there are a plurality of connections between volumes and the container (compute node), I/O paths to be used are controlled by an OS (Operating System).

(B-1)

If the plurality of synchronized volumes are connected to the container, both a connection path to a storage device located at the same site as that of the container and a connection path(s) to a storage device(s) located at a site(s) different from that of the container can be used; however, there is a possibility that the connection path to the storage device located at the site different from that of the container may be used (its I/O performance is worse than the former case).

In this embodiment in this regard, by attaching a site identifying label to both the compute node and the storage device(s) in advance, it is possible to raise the priority of the connection to the storage device which matches the site of the node to be activated by the container.

As a result, the communication with the matching site identifying label (within the same site) is prioritized, so that it is possible to prevent the degradation of the I/O performance.

(C)

With the conventional technology, the container management software does not detect a failure of the storage device, so that if the failure has occurred at the storage device, the container will not be relocated.

(C-1)

If a failure has occurred at a storage device at a site where the container is located, I/O to/from the container may stop or the performance may degrade.

If a plurality of synchronized volumes exist under this circumstance, a connection to a storage device where no failure has occurred can be used; however, if the site where the storage device with no failure occurrence is located is different from the site where the container is located, the I/O performance may degrade.

In this embodiment in this regard, a plug-in which is in operation at the node is caused to monitor the status of connected volumes and check if I/O can be performed to a volume whose connection priority is raised (a volume with a preferential setting for the connection). If there is a volume to which I/O cannot be performed (e.g., a storage device incapable of communication), the plug-in: determines that a failure has occurred at the storage device at the same site as that of the node; and prompts the container management software to relocate the container.

As the container management software performs the relocation of the container, it is possible to avoid the situation where the I/O performance may degrade.

Next, the embodiment of the present invention will be explained with reference to the drawings. The following description and the drawings illustrate examples in order to explain the present invention and some omissions and simplification are made as appropriate for the purpose of clarification of the explanation. The present invention can be also implemented in other various forms. Unless specifically limited, each constituent element may be either singular or plural.

Incidentally, in the following explanation, the same number will be assigned to the same elements in the drawings and an explanation about them will be omitted as necessary. Furthermore, when explaining elements of the same type without distinguishing them from each other, a common part (the part excluding a branch number) of the reference numeral including the branch number is used; and when explaining the elements of the same type by distinguishing them from each other, the reference numerals including the branch numbers may sometimes be used. For example, when explaining sites without particularly distinguishing them from each other, they will be described as "sites 101"; and when explaining the sites by individually distinguishing them from each other, they may sometimes be described as a "Site A 101-1" and "Site B 101-2."

The expressions "first," "second," "third," and so on in, for example, this description are attached to identify constituent elements and do not necessarily limit the quantity or the sequential order. Also, the numbers for identifying the constituent elements are used in each context; and the numbers used in one context do not necessarily indicate the same configuration in other contexts. Furthermore, this does not preclude a constituent element identified with a certain number from also having functions of constituent elements identified with other numbers.

Referring to FIG. 1, the reference numeral 100 represents a storage system according to a first embodiment as a whole.

The storage system 100 is provided with a plurality of sites 101 and a cluster 102. The site 101 is, for example, a data center for handling data relating to a user's business and is configured by including one or more compute nodes 110 and one or more storage devices 120. In this embodiment, a first site 101 (Site A 101-1) and a second site 101 (Site B 101-2) are taken and explained as an example of sites 101, but other sites 101 such as a third site 101 may be provided.

Furthermore, the storage system 100 is configured by including a controller node 130 (control plane) for managing the cluster 102 and a user terminal 140 to be operated by a user. Incidentally, the storage system 100 may include the user terminal 140 or may not include the user terminal 140. Furthermore, the cluster 102 may include the user terminal 140 or may not include the user terminal 140.

The "node(s)" herein used corresponds to hardware, a virtual machine, a container, or the like for executing software and typically corresponds to an operation unit for the OS. Incidentally, in the following explanation, when the compute node 110 and the controller node 130 are not distinguished from each other, they may be sometimes described as a node(s).

The compute node 110 is configured by including a connected volume management table 111, a container 112 (user APP), a plug-in (compute)113, container management software (compute)114, and an OS 115. Incidentally, the compute node 110 may be a physical device and is, for example, a server apparatus and includes an interface unit, a storage unit, a processor unit connected to them, and so on.

Functions of the compute node 110 (the container 112, the plug-in (compute) 113, the container management software (compute) 114, the OS 115, etc.) may be implemented, for example, by the processor unit by reading programs to the storage unit (software), may be implemented by hardware such as a dedicated circuit, or may be implemented by a combination of the software and the hardware. Incidentally, one function of the compute node 110 may be divided into a plurality of functions and the plurality of functions may be integrated as one function. For example, the plug-in (compute) 113 may be divided into a management unit described later, a detection unit described later, and an output unit described later. Furthermore, a part of the function of the compute node 110 may be provided as another function or may be included in another function. Furthermore, a part of the function of the compute node 110 may be implemented by, for example, another node capable of communicating with the compute node 110, a computer which is not illustrated in the drawing, and so on.

The storage device 120 is configured by including a volume 121 which can be used by the container 112, and a site identifying label 122 capable of identifying the site 101 where the relevant storage device 120 is provided. Incidentally, the storage device 120 includes a PDEV unit, a storage controller connected to the PDEV unit, and so on.

The controller node 130 is configured by including a node management table 131, a storage management table 132, a volume management table 133, a plug-in (controller) 134, container management software (controller) 135, and an OS 136. Incidentally, the controller node 130 may be a physical device and is, for example, a server apparatus and includes an interface unit, a storage unit, a processor unit connected to them, and so on.

Functions of the controller node 130 (the plug-in (controller) 134, the container management software (controller) 135, the OS 136, etc.) may be implemented, for example, by the processor unit by reading programs to the storage unit (software), may be implemented by hardware such as a dedicated circuit, or may be implemented by a combination of the software and the hardware. Incidentally, one function of the controller node 130 may be divided into a plurality of functions and the plurality of functions may be integrated as one function. For example, the plug-in (compute) 134 may be divided into a generation unit described later, an instruction unit described later, and a setting unit described later. Moreover, for example, the container management software (controller) 135 may be divided into a detection unit described later and an acceptance unit described later. Furthermore, a part of the function of the controller node 130 may be provided as another function or may be included in another function. Furthermore, a part of the function of the controller node 130 may be implemented by, for example, a compute node capable of communicating with the controller node 130, a computer which is not illustrated in the drawing, and so on.

Incidentally, in the description below for explanatory convenience, the plug-in (compute) 113 may be sometimes described as a site-side plug-in 113, the plug-in (controller) 134 may be sometimes described as a plug-in 134, the container management software (compute) 114 may be sometimes described as site-side container management software 114, and the container management software (controller) 135 may be sometimes described as container management software 135.

Figure 2:
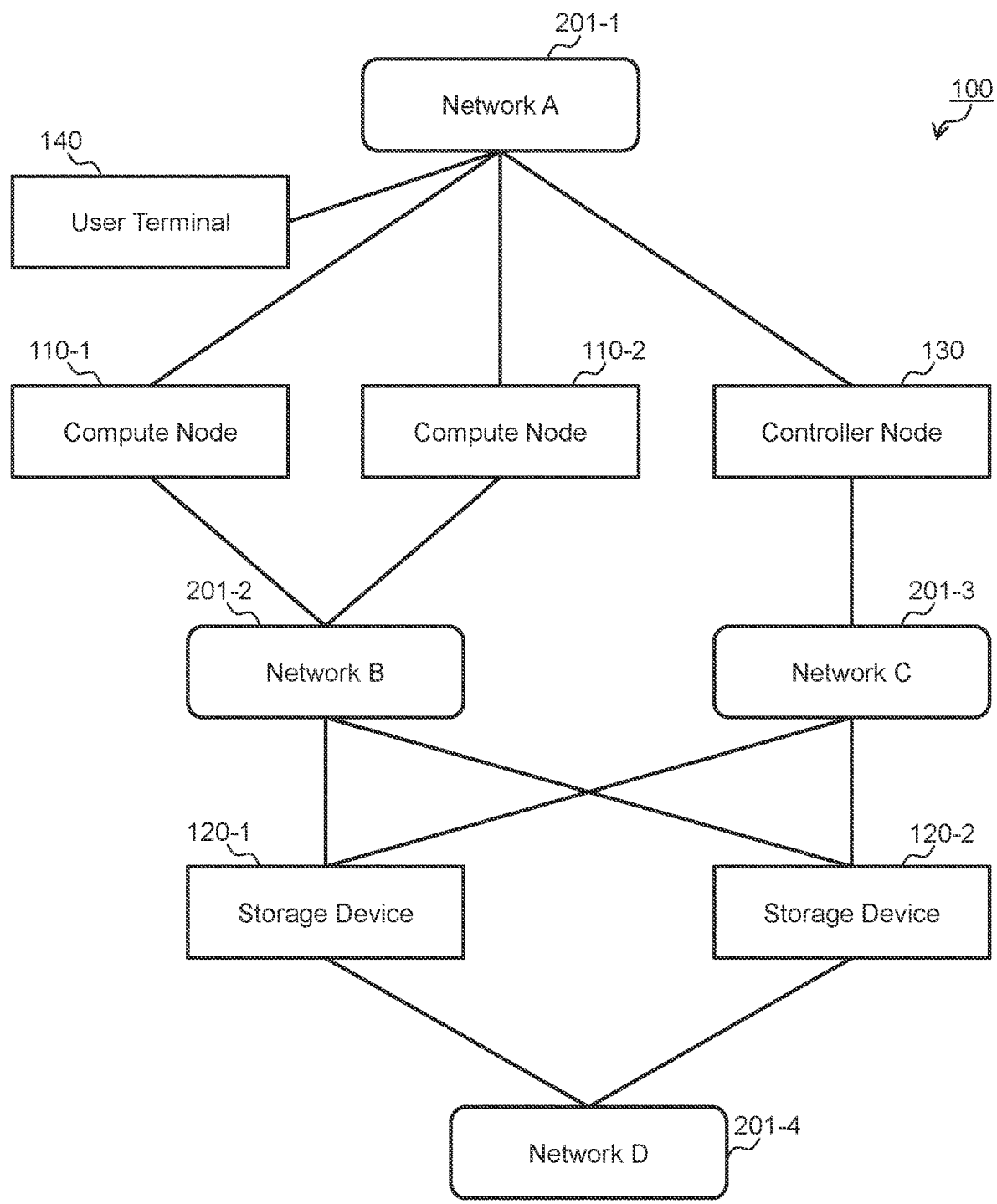
FIG. 2 is a diagram illustrating one example of a network configuration according to the first embodiment.

FIG. 2 is a diagram illustrating one example of a network configuration relating to the storage system 100.

A first network 201 (network A 201-1) is, for example, a LAN (Local Area Network) and is a network for communication between the compute nodes 110 and the controller node 130 which constitute the cluster 102. The compute node(s) 110, the controller node 130, and the user terminal 140 are connected together via the first network 201 so that they can communicate with each other. For example, the controller node 130 issues an instruction to each compute node 110 via the first network 201 in response to a request from the user terminal 140.

A second network 201 (network B 201-2) is an FC (Fibre Channel) network, a SCSI (Small Computer System Interface) network, etc. and is a network for the compute nodes 110 to perform data I/O to/from the volumes 121 for the storage devices 120. The compute nodes 110 and the storage devices 120 are connected via the second network 201 so that they can communicate with each other. The SCSI communication standards such as FC or iSCSI are used for the communication. Incidentally, any one of the compute nodes 110 can access all the storage devices 120.

A third network 201 (a network C 201-3) is, for example, a LAN and is a network for communication to use REST API (Representational State Transfer Application Programming Interface). The controller node 130 and the storage devices 120 are connected together via the third network 201 so that they can communicate with each other. For example, the plug-in 134 for the controller node 130 issues a command (an instruction to perform operations with respect to each storage device 120) to the storage devices 120 via the third network 201.

A fourth network 201 (network D 201-4) is, for example, an FC network and is a network for connecting the storage devices 120 together. The storage devices 120 are connected together via the fourth network 201 so that they can communicate with each other. For example, each storage device 120 performs data synchronization via the fourth network 201.

The above-described network configuration is one example and other network configurations may be adopted.

Figure 3:
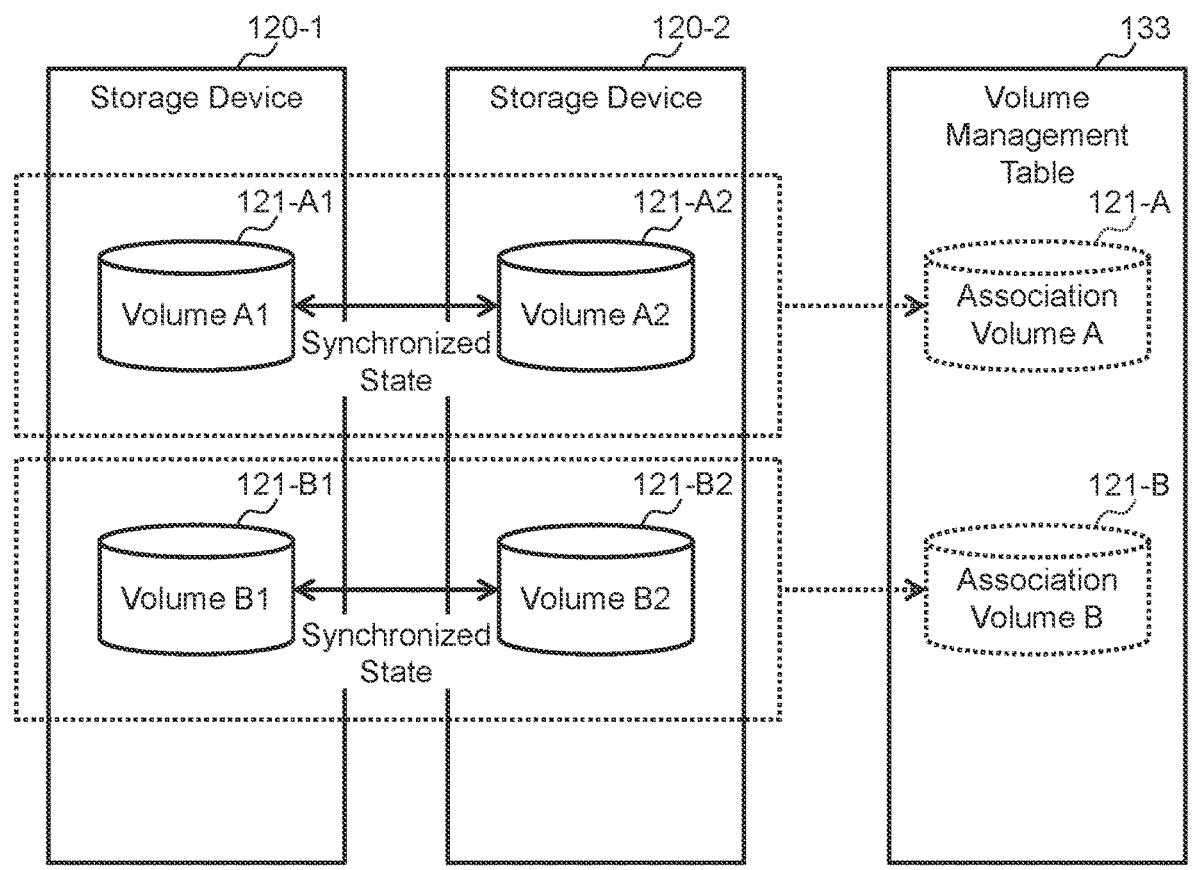
FIG. 3 is a diagram illustrating one example of association volumes according to the first embodiment.

FIG. 3 is a diagram illustrating one example of the association volumes 121. FIG. 3 shows that if a volume 121 recognized by the site-side container management software 114 is an association volume 121, a plurality of volumes 121 are actually associated with each other.

In the storage system 100, volumes 121 in a synchronized state are associated with each other as an association volume 121 by the volume management table 133. For example, the site-side container management software 114 recognizes a volume A121-A1 and a volume A121-A2, which are in the synchronized state, as an association volume 121-A and recognizes a volume B121-B1 and a volume B121-B2, which are in the synchronized state, as an association volume 121-B.

Incidentally, this embodiment will be described by taking an example of the case where there are two volumes 121 in the synchronized state; however, there may be three or more volumes 121 which are in the synchronized state.

Figure 4:
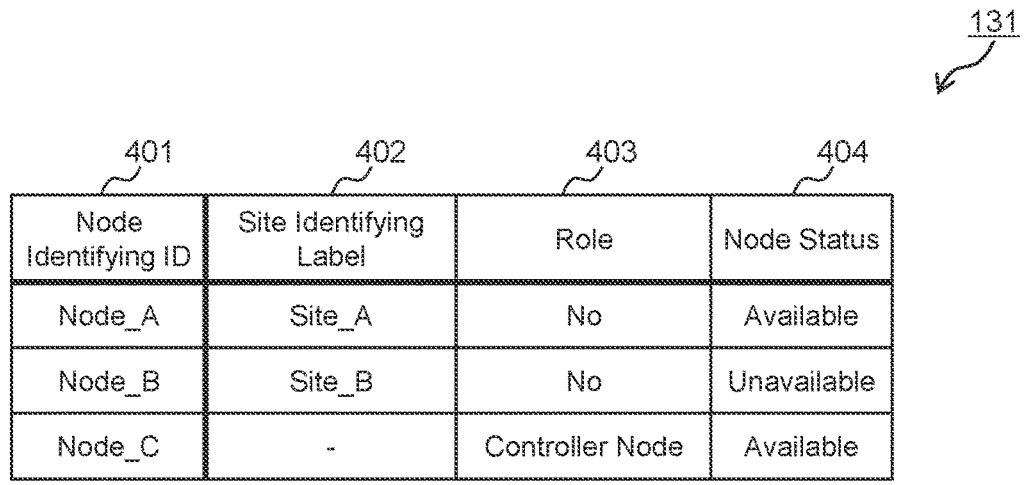
FIG. 4 is a diagram illustrating one example of a node management table according to the first embodiment.

FIG. 4 is a diagram illustrating one example of the node management table 131.

The node management table 131 is a table managed by the container management software 135 and is a table for managing (accumulating) information of the respective nodes which constitute the cluster 102. Incidentally, the information of the nodes includes information of both the compute nodes 110 and the controller node 130.

More specifically, the node management table 131 stores records associated with information of a node identifying ID 401, a site identifying label 402, a role 403, and a node status 404.

The node identifying ID 401 is an ID (unique character string) for identifying the relevant node. The site identifying label 402 is label information (unique character string) indicating to which site 101 the relevant node belongs. The role 403 is information indicating a role of the relevant node. Whether it is a compute node 110 or not can be identified by the information of this role 403. For example, if the role 403 is "No," it indicates that the relevant node is the compute node 110. The node status 404 is information indicating whether the relevant node is available or not. For example, regarding the node at which a failure has occurred, its node status 404 is "unavailable."

Figure 5:
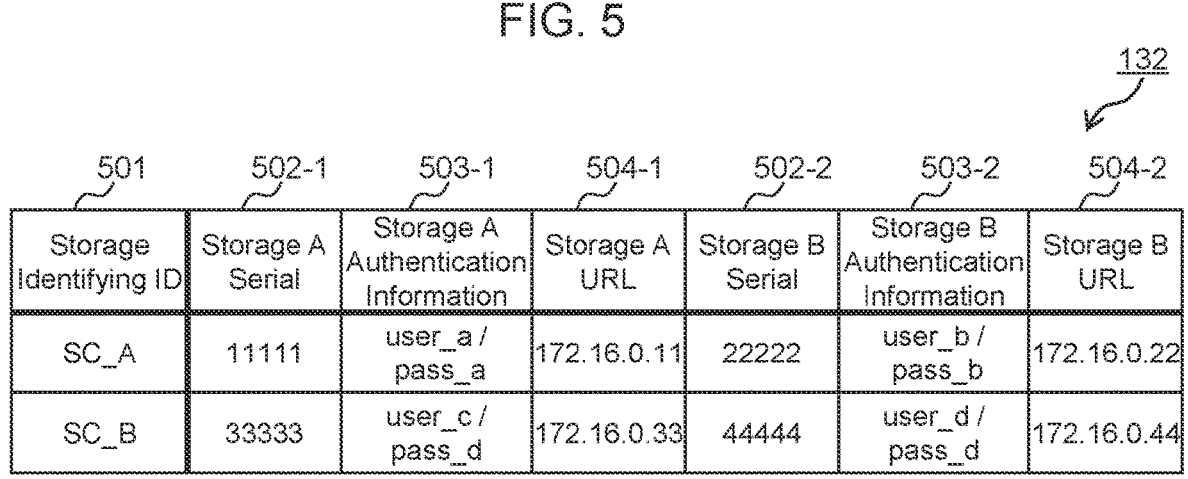
FIG. 5 is a diagram illustrating one example of a storage management table according to the first embodiment.

FIG. 5 is a diagram illustrating one example of the storage management table 132.

The storage management table 132 is a table managed by the container management software 135 and is a table for managing information of the storage devices 120 used when creating a volume(s) 121. The information of the storage devices 120 is stored in the storage management table 132 by the user via, for example, the user terminal 140.

More specifically, the storage management table 132 stores records associated with information of a storage identifying ID 501, a storage serial 502, storage authentication information 503, and a storage URL 504. Incidentally, with the conventional technology, one record stores information of one storage device 120; however, in this embodiment, one record is expanded to store information of a plurality of storage devices 120 relating to a plurality of volumes 121 which are synchronization objects.

In addition, the information of the storage serial 502, the storage authentication information 503, and the storage URL 504 is associated with the storage identifying ID 501 according to the number of storage devices 120 which provide the plurality of the respective volumes which are synchronization objects. For example, if a volume 121-1 provided by a storage device 120-1 at Site A 101-1 and a volume 121-2 provided by a storage device 120-2 at Site B 101-2 are synchronization objects, the storage management table 132 stores a record associated with information of the storage identifying ID 501, a storage A serial 502-1, storage A authentication information 503-1, storage A URL 504-1, storage B serial 502-2, storage B authentication information 503-2, and storage B URL 504-2.

The storage identifying ID 501 is an ID for identifying the respective storage devices 120, which provide the plurality of volumes 121 that are the synchronization objects, as one storage device 120. This ID (character string) can be decided by the user when the user registers the information of the storage devices 120 in the storage management table 132. Incidentally, when the user creates a volume 121, the user designates the storage identifying ID 501 via the user terminal 140 and sends a request to the container management software 135. The storage serial 502 is a serial number of the storage device 120. The storage authentication information 503 is authentication information (an ID, a password, etc. used for authentication) of the storage device 120. The storage URL 504 is a URL (Uniform Resource Locator) of the storage device 120 to indicate the location of the storage device 120. Incidentally, the information stored in the storage management table 132 is generated by processing in S802 described later.

FIG. 6 is a diagram illustrating one example of the volume management table 133.

The volume management table 133 is a table managed by the container management software 135 and is a table for managing information of volumes 121 created at the storage devices 120.

More specifically, the volume management table 133 stores records associated with information of a volume identifying ID 601, a storage identifying ID 602, NAA (Network Address Authority) 603, a storage serial 604, and a storage volume ID 605.

With the conventional technology, one record stores the information of one volume 121; however, in this embodiment, one record is expanded to store the information of a plurality of volumes 121 to which the synchronization setting is set. Additionally, the information of the storage serial 604 and the storage volume ID 605 is associated with the volume identifying ID 601 in accordance with the number of volumes 121 to which the synchronization setting is set. For example, if the synchronization setting is set to the volume 121-1 at Site A 101-1 and the volume 121-2 at Site B 101-2, the volume management table 133 stores records associated with information of the volume identifying ID 601, the storage identifying ID 602, the NAA 603, a storage A serial 604-1, a storage A volume ID 605-1, a storage B serial 604-2, and a storage B volume ID 605-2.

The volume identifying ID 601 is an ID (unique character string) for identifying the relevant volume 121. This character string is generated by the container management software 135, for example, when the relevant volume 121 is created; and after that, this character string is used as a unique ID for identifying the relevant volume 121. Incidentally, the site-side container management software 114 cannot tell whether the volume 121, which is identified by the volume identifying ID 601, is an association volume 121 or not. Additionally, the volume management table 133 may store information of a volume(s) 121 to which the synchronization setting is not set, although the illustration of such volume is omitted in the drawing.

The storage identifying ID 602 is an ID for identifying the storage device 120 used to create the volume 121 (the storage identifying ID 501 in the storage management table 132). The NAA 603 is identification information of the volume 121, which is used when the OS 115 recognizes the volume 121 of the storage device 120 as a device. The storage serial 604 is a serial number of the storage device 120 associated by the storage identifying ID 602 (the storage identifying ID 501). The storage volume ID 605 is an ID of the volume 121 created within the relevant storage device 120. Incidentally, the information stored in the volume management table 133 is generated by processing in S904 described later.

FIG. 7 is a diagram illustrating one example of the connected volume management table 111.

The connected volume management table 111 is provided independently for each compute node 110. The connected volume management table 111 is a table managed by the site-side plug-in 113 and is a table for managing information of volumes connected to the compute node 110. When the plug-in 134 performs processing for connecting a volume 121 to the compute node 110 where the container 112 is to be activated, information of that volume 121 is written to the connected volume management table 111 in the relevant compute node 110.

More specifically, the connected volume management table 111 stores records associated with information of an NAA 701, a storage volume ID 702, a storage serial 703, and an column indicating with/without preferential setting 704.

The NAA 701 is identification information of the volume 121, which is used when the OS 115 for the compute node 110, in which the connected volume management table 111 is provided, recognizes the volume 121 of the storage device 120 as a device. The storage volume ID 702 is an ID of the volume 121 created within the relevant storage device 120. The storage serial 703 is a serial number of the relevant storage device 120. The column indicating with/without preferential setting 704 indicates whether or not the preferential setting is set for the connection between the relevant volume 121 and the relevant compute node 110. Incidentally, the information stored in the connected volume management table 111 is generated by processing in S1004 described later. Additionally, with the conventional technology, the connected volume management table 111 is not provided.

Figure 8:
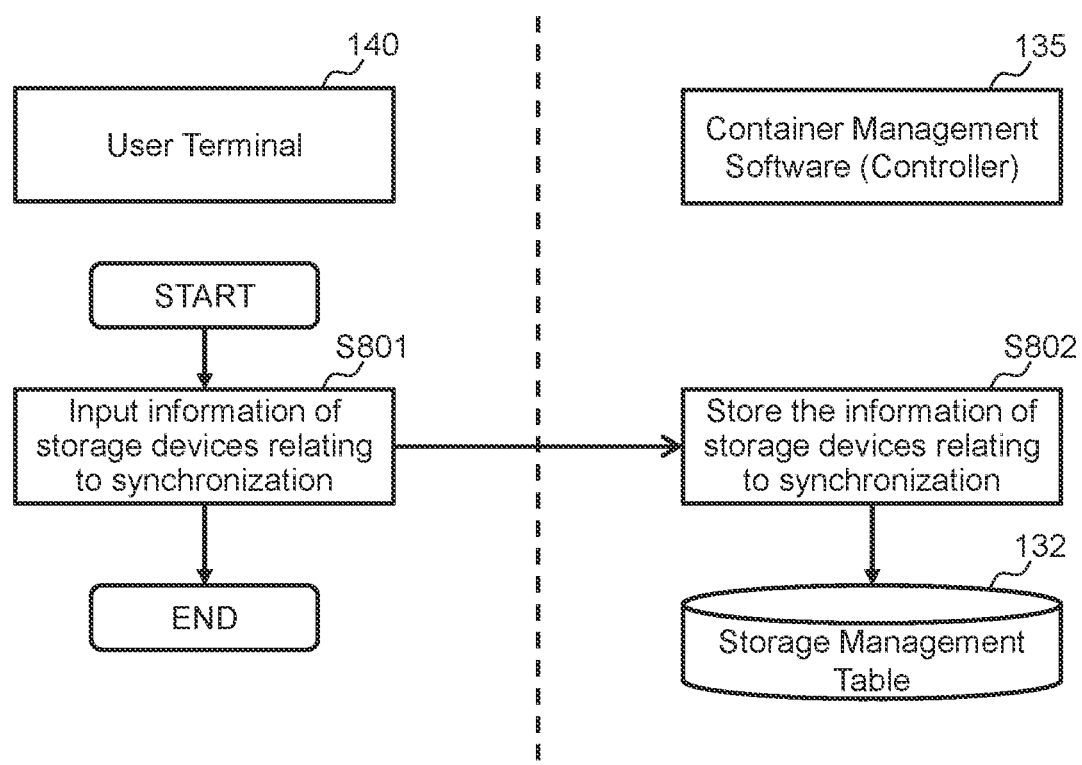
FIG. 8 is a diagram illustrating one example of a processing flow indicating storage information input processing according to the first embodiment.

FIG. 8 is a diagram illustrating one example of a processing flow indicating processing executed when inputting information of storage devices 120 relating to the synchronization (storage information input processing). Incidentally, the storage information input processing is preprocessing for volume-creation-related processing described later.

In S801, the user terminal 140 inputs information of the storage devices 120 relating to the synchronization. That information is configured by including necessary information for a record to be recorded in the storage management table 132 and includes, for example, information of the storage serial 502, the storage authentication information 503, and the storage URL 504 of the respective storage devices 120 which provide a plurality of volumes 121 which are synchronization objects.

In S802, the container management software 135 stores the information of the storage devices 120, which is input via the user terminal 140, in the storage management table 132.

Figure 9:
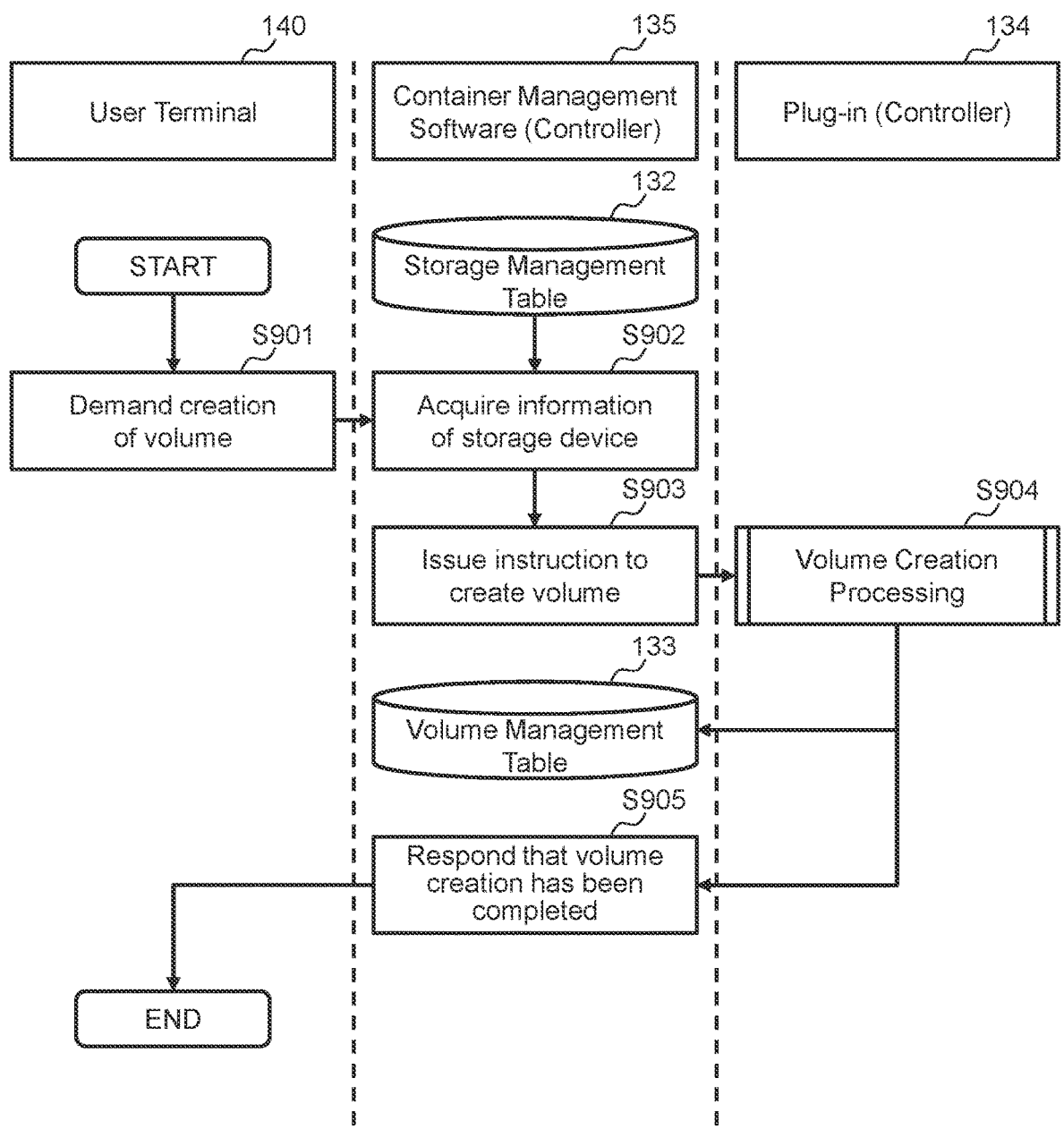
FIG. 9 is a diagram illustrating one example of a processing flow indicating volume-creation-related processing according to the first embodiment.

FIG. 9 is a diagram illustrating one example of a processing flow indicating processing executed when creating a volume 121 which is a synchronization object (volume-creation-related processing).

In S901, the user terminal 140 demands the creation of a volume 121. More specifically, the user terminal 140 demands that the container management software 135 should create a volume 121 by designating necessary information to create the volume 121 (e.g., the capacity of the volume) and one record of the storage management table 132 (e.g., the storage identifying ID 501) as operated by the user.

In S902, the container management software 135 acquires the designated record (the information of the storage device 120 relating to the synchronization) from the storage management table 132.

In S903, the container management software 135 issues an instruction to the plug-in 134 to create the volume 121. Incidentally, in S903, the information of the storage device 120, which was acquired in S902, is delivered to the plug-in 134.

In S904, the plug-in 134 performs volume creation processing. In the volume creation processing, the plug-in 134 issues an instruction to the storage device 120 relating to the synchronization to create the volume 121, performs the synchronization of the created volume 121, and adds the thus-obtained information to the volume management table 133 as information of the association volume 121. Incidentally, the details of the volume creation processing will be explained later in detail with reference to FIG. 11.

In S905, the container management software 135 transmits (replies) information indicating the completion of creation of the volume 121 to the user terminal 140.

Figure 10:
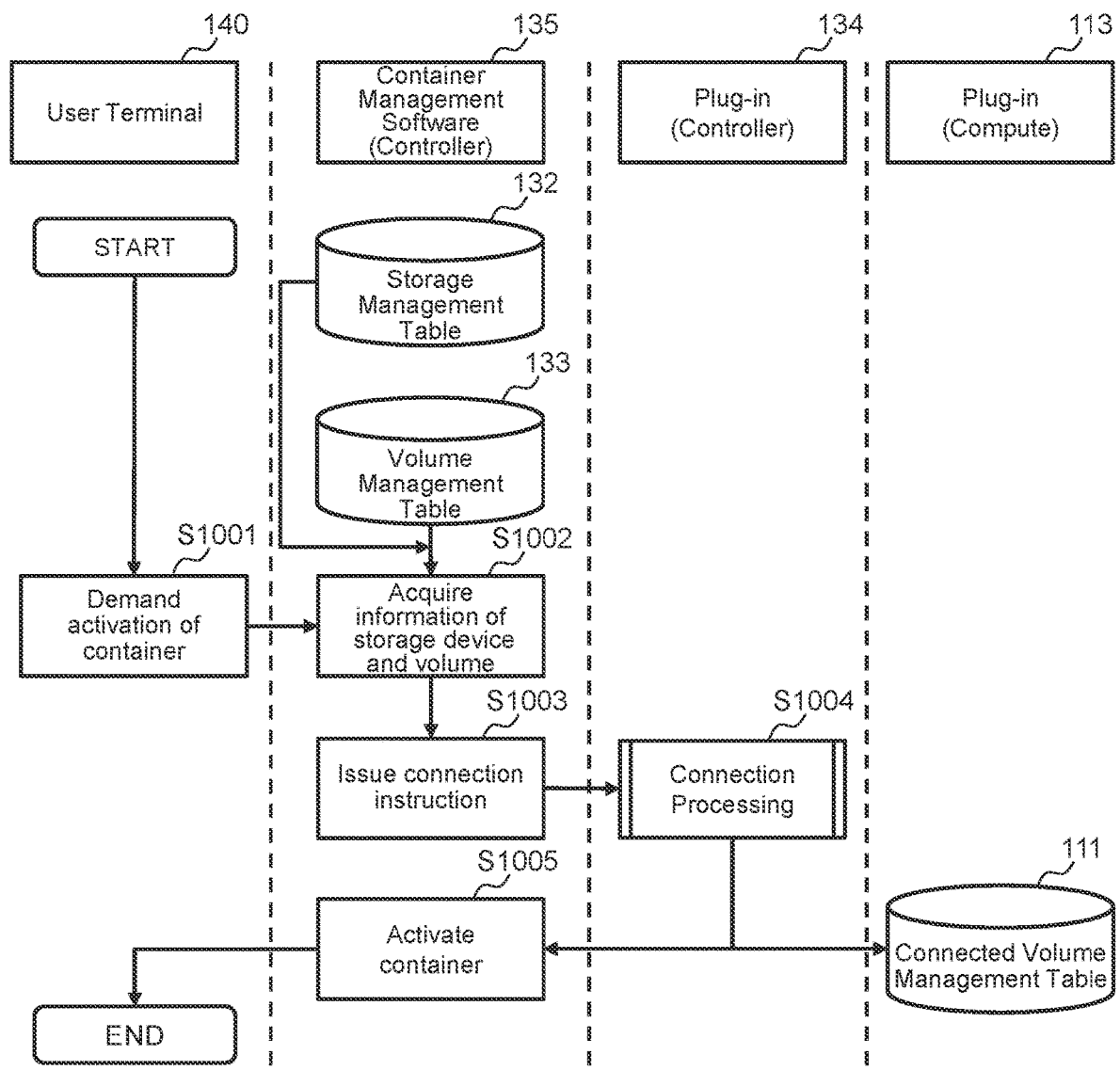
FIG. 10 is a diagram illustrating one example of a processing flow indicating container activation processing according to the first embodiment.

FIG. 10 is a diagram illustrating one example of a processing flow indicating processing executed when activating the container 112 (container activation processing).

In S1001, the user terminal 140 demands the activation of the container 112 (user APP). For example, the user inputs a command by designating the volume 121 (e.g., the volume identifying ID 601) via the user terminal 140.

In S1002, the container management software 135 acquires information of the designated volume 121 from the volume management table 133 and acquires information of the storage device 120, which provides the relevant volume 121, from the storage management table 132.

In S1003, the container management software 135 decides a compute node 110 to locate (activate) a container 112 and issues an instruction to the plug-in 134 to connect the volume 121, which is to be set to that container 112, and the relevant compute node 110. Incidentally, in S1003, the information of the volume 121 and the information of the storage device 120, which were acquired in S1002, and the identifier of the compute node 110 in which the container 112 is to be located (a container-deployed node) are delivered to the plug-in 134.

In S1004, the plug-in 134 executes connection processing. In the connection processing, the volume 121 and the container-deployed node are connected and information relating to the connection is added to the connected volume management table 111. Incidentally, the details of the connection processing will be described later with reference to FIG. 12.

In S1005, the container management software 135 activates the container 112. Incidentally, the container management software 135 sets the volume identifying ID to the container 112 at appropriate timing.

Figure 11:
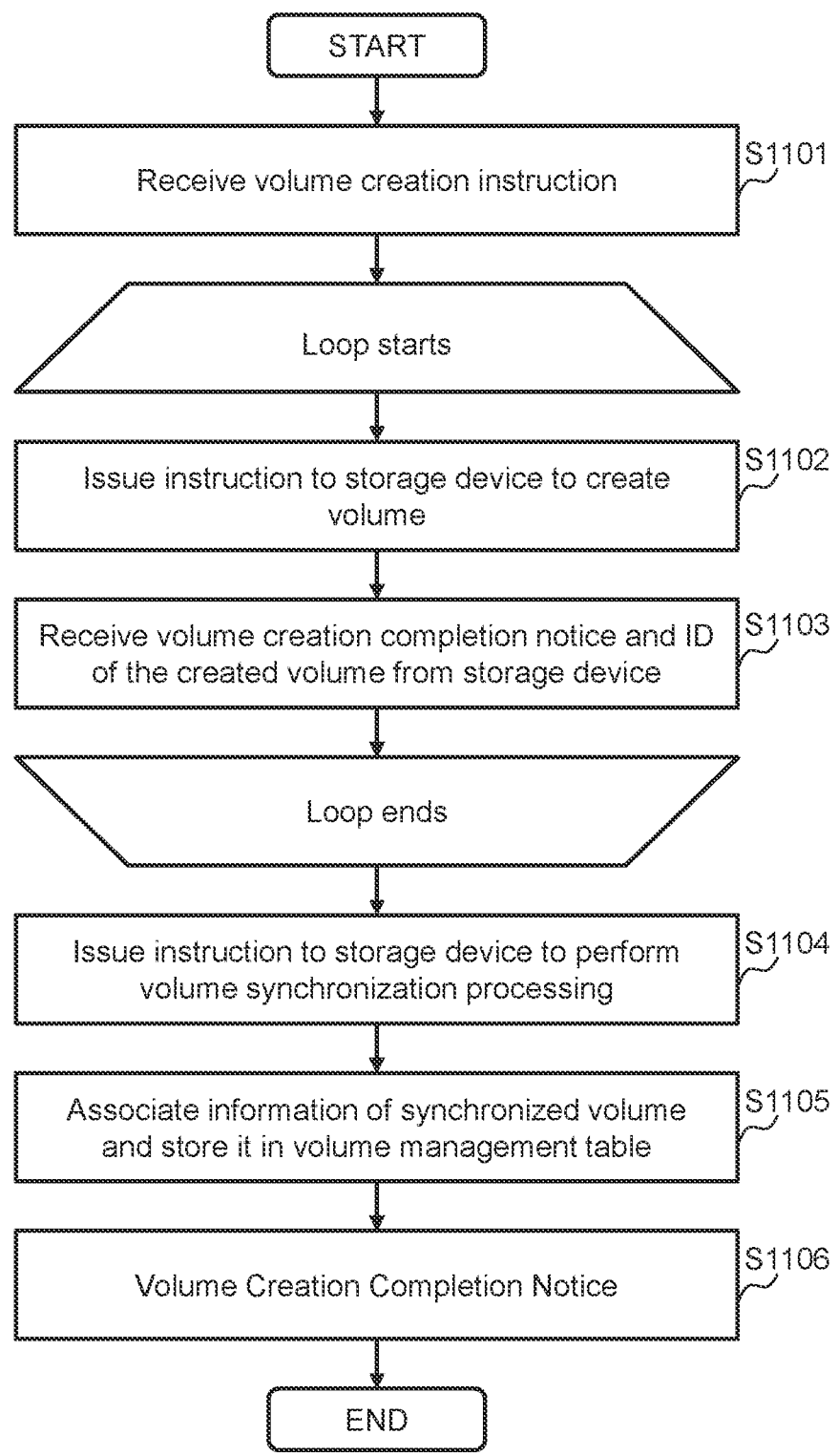
FIG. 11 is a diagram illustrating one example of volume creation processing according to the first embodiment.

FIG. 11 is a diagram illustrating one example of the volume creation processing.

In S1101, the plug-in 134 receives the instruction from the container management software 135 to create a volume 121. This instruction includes, for example, information such as the capacity of the volume 121, the storage devices 120 relating to the synchronization, and so on.

Then, the plug-in 134 executes processing in S1102 and S1103 with respect to each storage device 120 relating to the synchronization.

In S1102, the plug-in 134 issues an instruction to the storage device 120, which is a processing object, to create the volume 121.

In S1103, the plug-in 134 receives a notice indicating that the creation of the volume 121 has been completed, and the ID of the created volume 121 (the storage volume ID) from the processing object storage device 120.

In S1104, the plug-in 134 issues an instruction to the storage devices 120 relating to the synchronization to perform the synchronization processing of the volume 121 created in S1103.

In S1105, the plug-in 134 associates the information of the volumes 121 synchronized in S1104 and stores it in the volume management table 133. For example, the plug-in 134 generates NAA and stores the generated NAA, the storage identifying ID and the storage serial which were received in S1101, and the plurality of storage volume IDs received in S1103, as one record, in the volume management table 133. Incidentally, the NAA may be generated at appropriate timing. Furthermore, the NAA may be generated by other constituent elements.

In S1106, the plug-in 134 reports (replies) information indicating the completion of creation of the volume 121 to the container management software 135.

With the conventional container management software, one volume was created when creating the volume and was recorded as one record in a volume management table. In this embodiment in this regard, a plurality of volumes 121 are created and the synchronization setting is set and the information of the plurality of volumes 121 is stored as one record in the volume management table 133.

Figure 12:
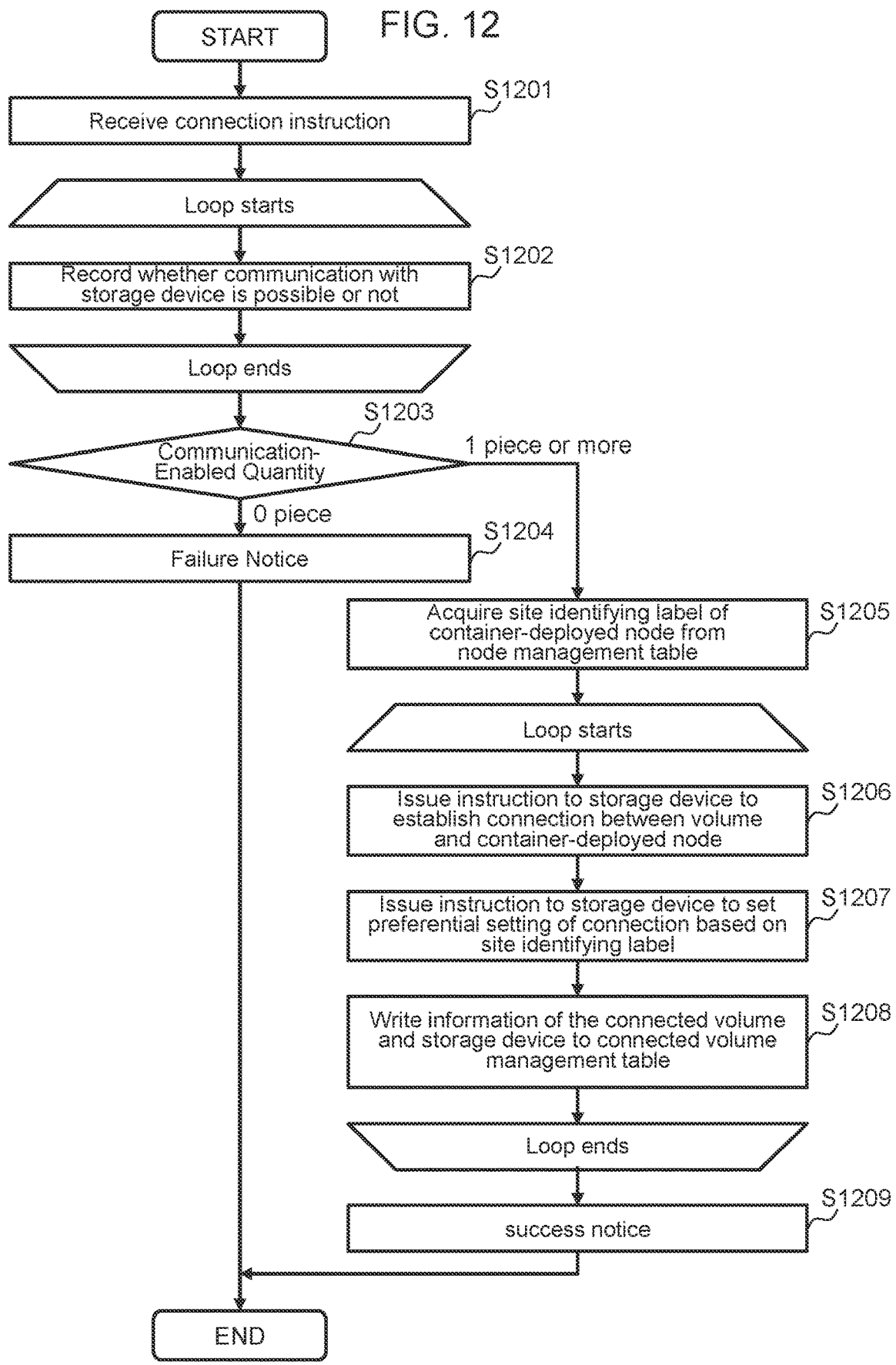
FIG. 12 is a diagram illustrating one example of connection processing according to the first embodiment.

FIG. 12 is a diagram illustrating one example of the connection processing.

In S1201, the plug-in 134 receives an instruction (connection instruction) from the container management software 135 to connect the volume 121 and the compute node 110 where the container 112 which uses that volume 121 is located. For example, the connection instruction includes the volume identifying IDs, the information of the plurality of volumes 121 linked to the volume identifying IDs, and the identifier of the container-deployed node (e.g., the node identifying ID). The plug-in 134 identifies (designates) the volumes 121 to which the synchronization setting is set, and the storage devices 120 which provides the volumes, on the basis of the connection instruction.

Additionally, the user basically does not designate at which site 101 the container 112 should be activated. The container management software 135 decides at which site 101 the container 112 should be activated; and the relevant information (the identifier of the container-deployed node) is delivered to the plug-in 134 upon the connection instruction.

Subsequently, the plug-in 134 executes the processing in S1202 with respect to each of the storage devices 120 and the volumes 121 identified in S1201.

In S1202, the plug-in 134 records whether the communication with the storage device 120 which is a processing object is possible or not. For example, the plug-in 134 calls (evokes) an API to check the communication with the processing object storage device 120 and judges whether the communication with the processing object storage device 120 is possible or not; and if the plug-in 134 judges that the communication with the processing object storage device 120 is possible, it records the storage device(s) 120 and the volume(s) 121 as those which are capable of communication (counts a communication-enabled quantity).

In S1203, the plug-in 134 judges whether the communication-enabled quantity is "0 (zero)" or not. If it is judged that the communication-enabled quantity is "0," the plug-in 134 proceeds to the processing in S1204; and if it is judged that the communication-enabled quantity is not "0" (if it is judged that the communication-enabled quantity is "1" or more), the plug-in 134 proceeds to the processing in S1205.

In S1204, the plug-in 134 reports a failure of the processing to the container management software 135 and terminates the connection processing.

In S1205, the plug-in 134 acquires the site identifying label of the container-deployed node from the node management table 131 by using the identifier of the container-deployed node.

Then, the plug-in 134 executes the processing in S1206 to S1208 with respect to each of the storage devices 120 and the volumes 121 which are capable of communication.

In S1206, the plug-in 134 issues an instruction to the processing object storage device 120 to connect the volume 121 and the container-deployed node. For example, the plug-in 134 calls the API to connect the volume 121 and the container-deployed node. As a result, the volume 121 and the container-deployed node enter into a connected state.

In this embodiment, once the volume 121 of the storage device 120 is connected to the compute node 110, the OS 115 automatically recognizes it as a device file. Additionally, in order to use the volume 121, the connected volume 121 is identified from among device files recognized by the OS 115 and the identified volume 121 is mounted in a file system possessed by the OS 115. Incidentally, the volume 121 is identified by using the NAA (the identifier for identification of the volume 121 of the storage device 120 by the OS 115) which is delivered in the sequential order of the plug-in 134, the container management software 135, and the site-side plug-in 113.

More specifically, once the volume 121 of the storage device 120 is connected to the compute node 110, it is automatically recognized and is recognized as a device file by the OS 115. The device file(s) is created as many as the number of paths between the compute node(s) 110 and the storage device(s) 120. For example, if the connected volume 121 is the association volume 121, a minimum of two device files are recognized by the compute node 110 with respect to one volume 121. In other words, if the connection between the storage device 120 and the compute node 110 has redundancy, the number of device files to be recognized increases as many as the redundant connections.

Furthermore, the plurality of recognized device files are bundled into one multipath device file by a function of the OS 115 called a multipath. When a volume 121 is used from the container 112 (user APP) in the OS 115, this multipath device file is mounted. Since there is one mount for the container 112 (because one multipath device file is just mounted at one mount point), the volume 121 can be used without being conscious of a physical path to the volume 121.

In S1207, the plug-in 134 issues an instruction to the storage device 120 to set a preferential setting for the connection on the basis of the site identifying label. For example, the plug-in 134 sends an inquiry for the site identifying label to the processing object storage device 120 and judges whether the relevant site identifying label matches the site identifying label of the container-deployed node. If the plug-in 134 judges that they match each other, the plug-in 134 issues an instruction to the storage device 120 to set the preferential setting for the connection (calls the API to sets the preferential setting for the connection).

In this embodiment, as one example of a protocol for identifying an optimized path between the storage device 120 and the compute node 110, ALUA (Asymmetric Logical Unit Access) which is capable of the preferential setting for the connection between the storage device 120 and the compute node 110 is adopted; and in S1207, the preferential setting for ALUA is updated to "prioritize."

When performing I/O from the container 112 (user APP) to the volume 121, the multipath function of the OS 115 automatically selects an I/O path. Under this circumstance, the multipath function is compatible with ALUA; and, therefore, if there is a path with the preferential setting for ALUA among a plurality of paths bundled by the multipath device file, this path is detected and the path with high priority is selected as the I/O path.

Specifically speaking, as the preferential setting for ALUA is set on the storage device 120 side, the OS 115 side automatically detects this and, as a result, the I/O path with high priority will be used. Additionally, the plug-in 134 can raise the priority for paths by setting the preferential setting for ALUA.

In S1208, the plug-in 134 writes the information (the NAA, the storage volume ID, the storage serial, and with/without preferential setting) of the volume(s) 121 and the storage device(s) 120, which are connected, to the connected volume management table 111 via the site-side plug-in 113. Incidentally, the site-side plug-in 113 stores the information, which is reported by the plug-in 134, in the connected volume management table 111.

In S1209, the plug-in 134 reports a success of the processing to the container management software 135 and terminates the connection processing.

Under this circumstance, for example, let us assume that there are volume A and volume B which are synchronized. With the conventional technology, the volume A and the volume B are recognized independently by the container management software. If it is desired to use a volume from a container, the desired volume to be used is designated when creating the container. A parameter designated when creating the container continues to remain as a setting until the container is deleted. Accordingly, even if a container created by designating the volume A is migrated from Site A to Site B, that container continues to use the volume A. If the user wants to change the volume to be referenced by the container, the user needs to reset the container by manual operations and reactivate the container once. Since the relocation of the container is performed automatically, it is not desirable to require the user's manual operations.

Incidentally, it is possible to designate both the volume A and the volume B at the beginning when activating the container; however, since they are respectively recognized as independent volumes by the container management software and are also recognized as separate volumes by the container (user APP), so the advantage of the redundancy would not be used.

In this embodiment in this regard, both the volume A and the volume B are connected to the container from the beginning by introducing and using the association volume 121; and, therefore, the user's manual operations are not required when relocating the container.

Figure 13:
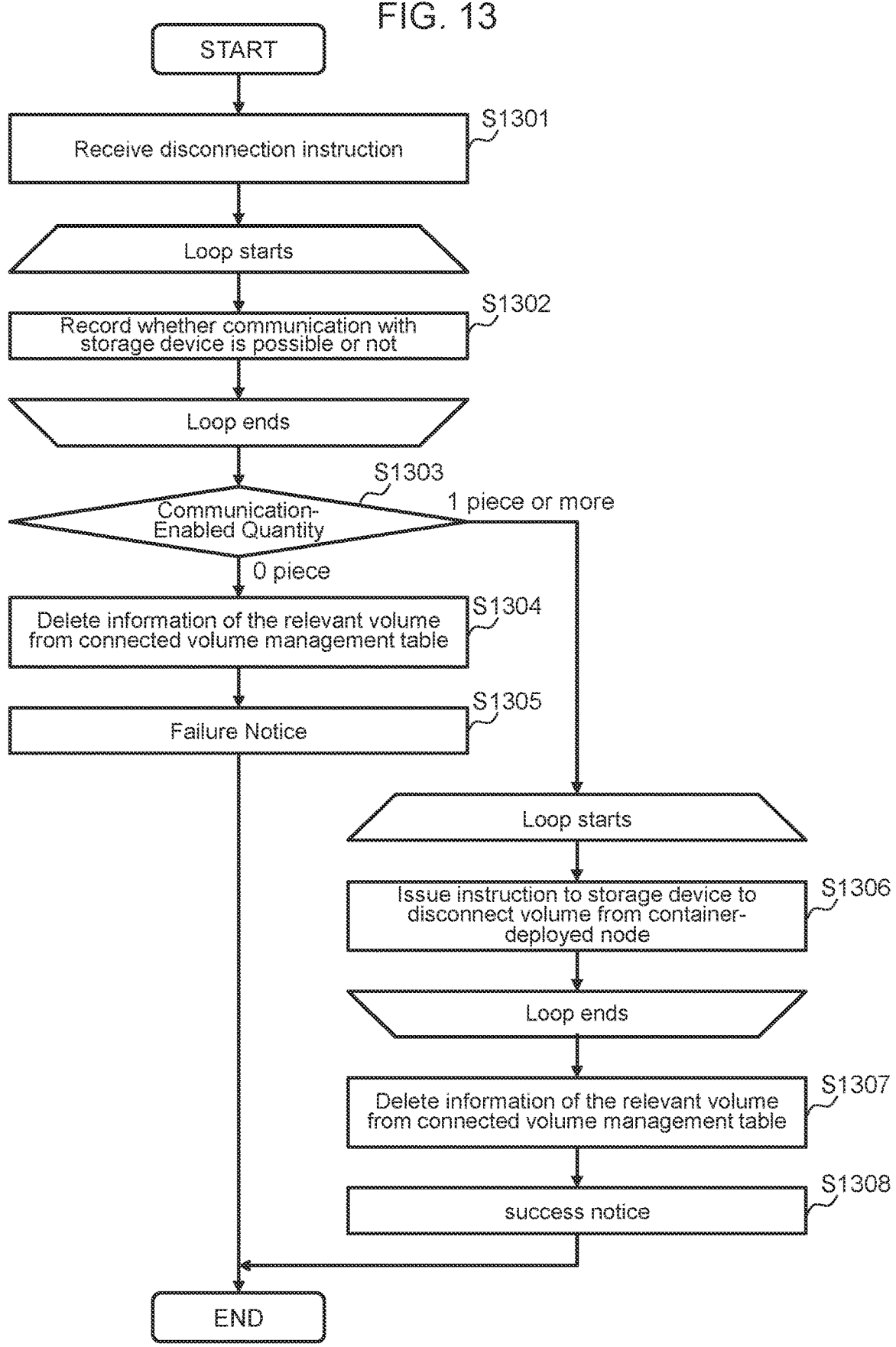
FIG. 13 is a diagram illustrating one example of disconnection processing according to the first embodiment.

FIG. 13 is a diagram illustrating one example of processing for canceling the connection (disconnection processing). In the disconnection processing, for example, the information stored in the connected volume management table 111 is deleted. The disconnection processing is executed at appropriate timing such as when a failure occurs at the compute node 110, when the container 112 is relocated, or when the user has finished using the volume 121.

In S1301, the plug-in 134 receives a disconnection instruction from the container management software 135 to disconnect the volume 121 from the compute node 110. For example, the disconnection instruction includes the volume identifying ID and information of a plurality of volumes 121 linked to the volume identifying ID. The plug-in 134 identifies (designates) the volumes 121 in a synchronized state and the storage devices 120 which provide the relevant volumes 121 on the basis of the disconnection instruction.

Subsequently, the plug-in 134 executes the processing in S1302 with respect to each of the storage devices 120 and the volumes 121 identified in S1301.

In S1302, the plug-in 134 records whether the communication with the processing object storage device 120 is possible or not. For example, if the plug-in 134 judges that the communication is possible, it records the storage device(s) 120 and the volume(s) 121 as those capable of communication (counts the communication-enabled quantity). Incidentally, a method of judging whether the communication is possible or not may be the same method as that in S1202 and an explanation about it is omitted.

In S1303, the plug-in 134 judges whether the communication-enabled quantity is "0" or not. If the plug-in 134 judges that the communication-enabled quantity is "0," it proceeds to the processing in S1304; and if the plug-in 134 judges that the communication-enabled quantity is not "0," it proceeds to the processing in S1306.

In S1304, the plug-in 134 deletes the information of the volumes 121 regarding which the disconnection instruction was issued from the connected volume management table 111 via the site-side plug-in 113.

In S1305, the plug-in 134 reports a failure of the processing to the container management software 135 and terminates the disconnection processing.

Furthermore, if the plug-in 134 judges that the communication-enabled quantity is not "0," it executes the processing in S1306 with respect to each of the storage devices 120 and the volumes 121 which are capable of communication.

In S1306, the plug-in 134 issues an instruction to the processing object storage device 120 to disconnect the volume 121, which is a processing object, from the compute node 110 (container-deployed node) where the container 112 which uses the relevant volume 121 is located. For example, the plug-in 134 calls the API to disconnect the volume 121 from the container-deployed node. As a result, the volume 121 and the container-deployed node enter into a disconnected state.

In S1307, the plug-in 134 deletes the information of the volume 121 regarding which the disconnection instruction was issued from the connected volume management table 111 via the site-side plug-in 113.

In S1308, the plug-in 134 reports a success of the processing to the container management software 135 and terminates the disconnection processing.

FIG. 14 is a diagram illustrating one example of processing for detecting a failure of the storage device 120 (storage failure detection processing). The storage failure detection processing is performed independently regularly at each compute node 110.

In S1401, the site-side plug-in 113 acquires information of all nodes from the node management table 131 via the plug-in 134.

In S1402, the site-side plug-in 113 judges whether or not there is any available compute node 110 with a different site identifying label from that of its local compute node 110. If the site-side plug-in 113 judges that there is an available compute node 110, it proceeds to the processing in S1403; and if the site-side plug-in 113 judges that there is no available compute node 110, it terminates the storage failure detection processing.

If the site-side plug-in 113 judges that there is an available compute node 110, it executes the processing in S1403 to S1407 with respect to each volume 121 recognized by the OS 115.

In S1403, the site-side plug-in 113 checks, by means of a SCSI command (e.g., an INQUIRY command), if there is any response from the storage device 120 which provides the processing object volume 121. Incidentally, if the processing object volume 121 is an association volume 121, the site-side plug-in 113 issues the SCSI command to not only the storage device 120 at the local site 101, but also the storage device 120 at the other site 101 which provides the volume 121 associated by the association volume 121.

In S1404, the site-side plug-in 113 judges whether there is any response or not. If the site-side plug-in 113 judges that there is a response (no failure has occurred at the storage device 120), it sets the next volume 121 as the processing object and proceeds to the processing in S1403; and if the site-side plug-in 113 judges that there is no response (a failure has occurred at the storage device 120), it proceeds to the processing in S1405.

In S1405, the site-side plug-in 113 checks whether or not the preferential setting is set to the volume 121 provided by the storage device 120 with no response, on the basis of the connected volume management table 111. For example, the site-side plug-in 113 judges whether or not a record corresponding to the volume 121 provided by the storage device 120 with no response is included in the connected volume management table 111 and the column indicating with/without preferential setting 704 of that record is "Yes."

In S1406, if the site-side plug-in 113 judges that the preferential setting is set, it proceeds to the processing in S1407; and if the site-side plug-in 113 judges that the preferential setting is not set, it sets the next volume 121 as the processing object and proceeds to the processing in S1403.

In S1407, the site-side plug-in 113: issues an instruction to the container management software 135 to relocate the container 112 which is in operation at its local compute node 110 using the processing object volume 121; and terminates the storage failure detection processing by exiting the loop.

In the storage failure detection processing, the site-side plug-in 113 determines that a failure has occurred at the storage device 120 (the volume 121) from which no response is made to the SCSI command; and judges whether the relevant volume 121 is prioritized or not (that is, whether the volume 121 is located at the same site 101 as that of the compute node 110), on the basis of whether or not the preferential setting is set in the connected volume management table 111. If the site-side plug-in 113 determines that a failure has occurred at the storage device 120 which provides the volume 121 located at the same site 101, it notifies the container management software 135 of information indicating that the container 112 which uses the relevant volume 121 is to be relocated to another site 101.

FIG. 15 is a diagram illustrating one example of processing when a failure has occurred at the compute node 110 (node-failure-related processing).

In S1501, the container management software 135 detects a failure at the compute node 110 which belongs to the cluster 102.

In S1502, the container management software 135 issues an instruction to the plug-in 134 to disconnect the volume 121 from the compute node 110 where the failure has occurred, with respect to all the containers 112 in operation at the compute node 110 where the failure has occurred. Incidentally, the plug-in 134 executes the aforementioned disconnection processing in accordance with the above-described instruction.

In S1503, the container management software 135: allocates another compute node 110 which is in normal operation, with respect to all the containers 112 in operation at the compute node 110 where the failure has occurred; and issues an instruction to the plug-in 134 to connect the volume 121 with the allocated compute node 110. Incidentally, the plug-in 134 executes the aforementioned connection processing in accordance with the above-described instruction.

By the connection processing, settings are set regarding each of volumes 121 associated with the association volume 121 designated by the container 112, which is relocated from the compute node 110 where the failure has occurred to another compute node in normal operation, so that: whether the storage device 120 at which the relevant volume 121 is created, and the other compute node 110 are provided at the same site 101 or not is judged; and the volume 121 created at the storage device 120 which is judged as being provided at the same site 101 will be used preferentially.

The availability of the storage system can be enhanced according to this embodiment.

(II) Supplemental Description

The aforementioned embodiment includes, for example, the following content.

The aforementioned embodiment has described the case where the present invention is applied to the storage system; however, the present invention is not limited to this example and can be applied to a wide variety of other systems, devices, methods, and programs.

Moreover, in the aforementioned embodiment, the "interface unit" may be one or more interfaces. The one or more interfaces may be one or more communication interface devices of the same type (e.g., one or more NICs [Network Interface Cards]) or two or more communication interface devices of different types (e.g., an NIC and an HBA [Host Bus Adapter]).

Furthermore, in the aforementioned embodiment, the "storage unit" may be at least one of a memory unit and the PDEV unit (typically, at least the memory unit).

Furthermore, in the aforementioned embodiment, the "memory unit" is one or more memories and may be typically a main storage device. At least one memory of the memory unit may be a volatile memory or a nonvolatile memory.

Furthermore, in the aforementioned embodiment, "the PDEV unit" is one or more PDEVs and may be typically an auxiliary storage device. The "PDEV(s)" means a physical storage device (Physical Storage Device) and is/are typically a nonvolatile storage device(s) such as an HDD (Hard Disk Drive) or an SSD (Solid State Drive).

Furthermore, in the aforementioned embodiment, the "processor unit" is one or more processors. At least one processor is typically a microprocessor such as a CPU (Central Processing Unit), but may be a processor of other types such as a GPU (Graphics Processing Unit). At least one processor may be of a single-core type or a multi-core type. At least one processor may be a processor in a broad sense such as a hardware circuit which performs a part or whole of processing (such as an FPGA [Field-Programmable Gate Array] or an ASIC [Application Specific Integrated Circuit]).

Furthermore, in the aforementioned embodiment, processing may be sometimes described by referring to a "program" as a subject; however, the program is executed by a processor unit and thereby performs defined processing by using a storage unit (such as a memory) and/or an interface unit (such as a communication port), so that the subject of the processing may be the processor. The processing explained by referring to a program as a subject may be recognized as processing to be performed by the processor unit or a device having that processor unit. Furthermore, the processor unit may include a hardware circuit which performs a part or whole of processing (such as an FPGA [Field-Programmable Gate Array] or an ASIC [Application Specific Integrated Circuit]).

Furthermore, in the aforementioned embodiment, a part or whole of the program may be installed from a program source into a device like a computer for implementing a node. The program source may be, for example, a program distribution server or a computer-readable recording medium (such as a non-transitory recording medium) which is connected via a network. Furthermore, in the aforementioned description, two or more programs may be implemented as one program and one program may be implemented as two or more programs.

Furthermore, in the aforementioned embodiment, the structure of each table is one example and one table may be divided into two or more tables and all or some of two or more tables may be one table.

Furthermore, in the aforementioned embodiment, the information relating to the storage system has been explained by using tables for explanatory convenience, but the data structure is not limited to the tables. The information relating to the storage system may be expressed by data structures other than the tables, such as XML (Extensible Markup Language), YAML (YAML Ain't a Markup Language), hash tables, and tree structures.

Furthermore, information such as programs, tables, and files for implementing each function in the aforementioned explanation can be placed in a memory, storage devices such as hard disks and SSDs, or storage media such as IC cards, SD cards, and DVDs.

The aforementioned embodiment has, for example, the following characteristic configurations.

(1)

A storage system (e.g., the storage system 100) manages a cluster (e.g., the cluster 102) configured by including compute nodes (e.g., the compute nodes 110) that are nodes which are provided respectively at a plurality of sites (e.g., the sites 101) and are capable of operating a container (e.g., the container 112), and storage devices (e.g., the storage devices 120) providing volumes (e.g., the volumes 121) which can be used by the container are provided at each of the plurality of sites, and the storage system includes: a generation unit (such as the controller node 130, the plug-in 134, a circuit, etc.) that generates information of an association volume (e.g., a record of the volume management table 133) which is associated with each of the volumes, on the basis of information of each of the volumes created at each of a plurality of storage devices designated from two or more sites; and an instruction unit (such as the controller node 130, the plug-in 134, a circuit, etc.) that issues an instruction to each storage device, at which each of the volumes is created, to connect each volume associated with the association volume and a compute node which operates the container, on the basis of a request for activation of the container for which the information of the association volume generated by the generation unit is designated.

In the above-described configuration, the two volumes associated with the association volume are connected with the compute node which operates the container; and, therefore, for example, even when the two volumes are synchronized with each other and the storage device at one of them becomes no longer available due to a failure, the volume of the other storage device can be used. With the above-described configuration, the user can continue working without the disconnection of I/O.

(2)

When the container is migrated from the first site to the second site and the volume used by the container is still the volume at the first site, there is fear that I/O performance may degrade.

In this regard, the above-described storage system includes a setting unit (e.g., the controller node 130, the plug-in 134, a circuit, etc.) that: judges, regarding each volume associated with the association volume, whether or not the storage device, at which the volume is created, and the compute node which operates the container are provided at the same site, on the basis of the request for activation of the container for which the information of the association volume generated by the generation unit is designated; and sets a setting to cause the volume created at the storage device, regarding which it is judged that the storage device and the compute node are provided at the same site, to be used preferentially.

In the above-described configuration, for example, the setting is set so that every time the container is activated, that container can use, among the plurality of synchronized volumes, the volume created at the storage device which is located at the same site as the site where the compute node which operates the container is located. With the above-described configuration, even if the container is migrated from the first site to the second site, the volume to be used by the container upon the activation of the container is allocated to the volume at the second site; and, therefore, it is possible to avoid the situation where the volume to be used by the container remains as the volume at the first site, and to avoid degradation of the I/O performance.

(3)

If a failure has occurred at the compute node at the first site, the container is automatically migrated to the second site by the container management software. The user's manual operations are required in order to switch the volume, which is the connection object, to the volume at the storage device at the second site with respect to the container migrated to the second site. The migration of the container is performed automatically by the container management software and switching of the storage device is also expected to be performed automatically.

In this regard, the above-described storage system includes a detection unit (e.g., the controller node 130, the container management software 135, a circuit, etc.) that detects a failure of the compute node, wherein if the failure is detected at the compute node by the detection unit, the setting unit judges, regarding each volume associated with the association volume designated at the container to be relocated from the compute node to another compute node, whether or not the storage device, at which the volume is created, and the other compute node are provided at the same site and sets a setting to cause the volume created at the storage device, regarding which it is judged that the storage device and the other compute node are provided at the same site, to be used preferentially (e.g., see FIG. 15 and FIG. 12).

In the above-described configuration, for example, the setting is set so that if a failure has occurred at the compute node at the first site where the container in operation exists, and if it is detected by the container management software that the relevant container has been relocated to the compute node at the second site, a volume which exists at the same site as the site of the relocated container will be used. With the above-described configuration, the volume existing at the same site as that of the relocated container will be used; and, therefore, it is possible to avoid the degradation of the I/O performance without having the user perform the manual operations to switch the volume in accordance with the relocation of the container due to the failure of the compute node.

(4)

If a failure has occurred at the storage device located at the first site where the container is in operation and if the connection object is switched to a volume at the storage device at the second site where no failure has occurred, among the plurality of synchronized volumes used by the container in operation, the container is located at the first site and, therefore, there is fear that the I/O performance may degrade.

In this regard, the compute node includes: a management unit (e.g., the compute node 110, the site-side plug-in 113, a circuit, etc.) that manages information; a detection unit (e.g., the compute node 110, the site-side plug-in 113, a circuit, etc.) that detects a failure of a storage device connected to the compute node; and an output unit (e.g., the compute node 110, the site-side plug-in 113, a circuit, etc.) that outputs information on the basis of the information managed by the management unit and a result detected by the detection unit, wherein if the setting unit sets the setting to cause the volume created at the storage device, regarding which it is judged that the storage device and the compute node are provided at the same site, to be used preferentially, the setting unit reports management information (e.g., information stored in the connected volume management table 111), which is associated with information of the volume (e.g., NAA), information of the storage device (e.g., the storage volume ID and the storage serial), and information indicating that the setting is set to cause the volume to be used preferentially (e.g., with/without preferential setting), to the compute node at the site (e.g., S1208); wherein the management unit for the compute node manages the management information reported by the setting unit; and wherein if a failure of the storage device is detected by the detection unit, the output unit for the compute node judges, based on the management information managed by the management unit, whether or not there is any volume to which the setting to cause the volume to be used preferentially at the compute node is set; and if it is judged that there is the volume to which the setting to cause the volume to be used preferentially is set, the output unit outputs information for urging relocation of a container which uses the volume in operation at the compute node (e.g., S1407).

With the above-described configuration, for example, if a failure has occurred at the storage device located at the first site where the container is in operation and if the connection object is switched to a volume at the storage device where no failure has occurred, information for prompting the migration of the container is output. As the migration of the container is performed by the container management software in accordance with such information, it is possible to avoid the situation where the I/O performance may degrade.

(5)

If a first volume at the storage device at the first site and a second volume at the storage device at the second site are managed individually, for example, the first volume can be referenced from a first container and the second volume can be referenced from a second container for separate use purposes. However, if the first volume and the second volume are synchronized with each other and are connected from the separate containers at the same time, data will be destroyed.

In this regard, the above-described storage system includes an acceptance unit (e.g., the controller node 130, the container management software 135, a circuit, etc.) that accepts input of information of the plurality of storage devices designated from the two or more sites and a request to create a volume for which the plurality of storage devices are designated, wherein if the request to create a volume for which the plurality of storage devices are designated from the two or more sites is accepted by the acceptance unit, the instruction unit issues an instruction to each of the plurality of storage devices to create a volume, receives information of the created volume from each of the plurality of storage devices, and issues an instruction to each of the plurality of storage devices to perform synchronization processing of the created volume (e.g., see FIG. 11).

With the above-described configuration, a plurality of volumes are created at the plurality of storage devices, the synchronization processing of the created volumes is performed, and an association volume with which the plurality of the synchronized volumes are associated is allocated to a container. With the above-described configuration, for example, it is possible to avoid the situation where the data may be destroyed, without having the synchronized volumes accessed from separate containers at the same time.

Furthermore, the aforementioned configurations may be changed, rearranged, combined, or omitted as appropriate within the scope not exceeding the gist of the present invention.

It should be understood that items included in a list in the format of "at least one of A, B, and C" can mean (A), (B), (C), (A and B), (A and C), (B and C), or (A, B, and C). Similarly, items listed in the format of "at least one of A, B, or C" can mean (A), (B), (C), (A and B), (A and C), (B and C), or (A, B, and C).

What is claimed is:

1. A storage system for managing a cluster configured by including compute nodes that are nodes which are provided respectively at a plurality of sites and are capable of operating a container, wherein storage devices providing volumes which can be used by the container are provided at each of the plurality of sites, the storage system comprising:

at least one processor configured to:

generate, for a set of the volumes that are created and synchronized with each other at a plurality of storage devices designated from two or more sites, an association volume which is virtually associated with each of the volumes of the set of the volumes, wherein the set of the volumes is recognized by the container based on the association volume; and issue an instruction to each storage device, at which each of the set of volumes is created, to connect each volume associated with the association volume and a compute node which operates the container, based on a request for activation of the container for which the generated association volume is designated.

2. The storage system according to claim 1, wherein the at least one processor is further configured to:

judge, regarding each volume associated with the association volume, whether or not the storage device, at which the volume is created, and the compute node which operates the container are provided at a same site, based on the request for activation of the container for which the generated association volume is designated; and set a setting to cause the volume created at the storage device, when it is judged that the storage device and the compute node are provided at the same site, to be used preferentially.

3. The storage system according to claim 2, wherein the at least one processor is further configured to:

detect a failure of the compute node, wherein if the failure is detected at the compute node, judge, regarding each volume associated with the association volume designated at a container to be relocated from the compute node to another compute node, whether or not the storage device, at which the volume is created, and the other compute node are provided at a same site and set a setting to cause the volume created at the storage device, when it is judged that the storage device and the other compute node are provided at the same site, to be used preferentially.

4. The storage system according to claim 2, wherein the at least one processor is further configured to:

manage information;

detect a failure of a storage device connected to the compute node; and control to output information based on the managed information and a detection result, wherein if the at least one processor sets the setting to cause the volume created at the storage device, when it is judged that the storage device and the compute node are provided at the same site, to be used preferentially, the at least one processor is further configured to perform control to report management information, which is associated with information of the volume, information of the storage device, and information indicating that the setting is set to cause the volume to be used preferentially, to the compute node at the site, wherein the at least one processor is further configured to manage the reported management information, and wherein if a failure of the storage device is detected, the at least one processor is further configured to perform control to judge, based on the managed information, whether or not there is any volume to which the setting to cause the volume to be used preferentially at the compute node is set; and if it is judged that there is the volume to which the setting to cause the volume to be used preferentially is set, the at least one processor is further configured to perform control to output information for urging relocation of a container which uses the volume in operation at the compute node.

5. The storage system according to claim 1, wherein the at least one processor is further configured to:

accept input of information of the plurality of storage devices designated from the two or more sites and a request to create a volume for which the plurality of storage devices are designated, wherein if the request to create a volume for which the plurality of storage devices are designated from the two or more sites is accepted, the at least one processor is further configured to issue an instruction to each of the plurality of storage devices to create a volume, control to receive information of the created volume from each of the plurality of storage devices, and issue an instruction to each of the plurality of storage devices to perform synchronization processing of the created volume.

6. A control method for a storage system for managing a cluster configured by including compute nodes that are nodes which are provided respectively at a plurality of sites and are capable of operating a container, wherein storage devices providing volumes which can be used by the container are provided at each of the plurality of sites, the control method comprising:

generating, by at least one processor, for a set of the volumes that are created and synchronized with each other at a plurality of storage devices designated from two or more sites, an association volume which is virtually associated with each of the volumes of the set of the volumes, wherein the set of the volumes is recognized by the container based on the association volume; and issuing an instruction, by the at least one processor, to each storage device, at which each of the set of volumes is created, to connect each volume associated with the association volume and a compute node which operates the container, based on a request for activation of the container for which the generated association volume is designated.

* * * * *